United States Patent [19]

Satoh et al.

[11] Patent Number: 4,680,348

[45] Date of Patent: Jul. 14, 1987

[54] EPOXY RESINOUS VARNISH ITS PREPARATION AND COATING COMPOSITION CONTAINING THE SAME

[75] Inventors: Haruhiko Satoh; Hisaki Tanabe, both of Yawata; Hirotoshi Umemoto, Uji, all of Japan

[73] Assignee: Nippon Paint Co., Ltd., Osaka, Japan

[21] Appl. No.: 661,331

[22] Filed: Oct. 16, 1984

[30] Foreign Application Priority Data

| Oct. 17, 1983 | [JP] | Japan | 58-1954540 |
| Oct. 17, 1983 | [JP] | Japan | 58-1954541 |
| Feb. 6, 1984 | [JP] | Japan | 59-19590 |
| Feb. 8, 1984 | [JP] | Japan | 59-22488 |

[51] Int. Cl.$^4$ .................... C08G 59/08; C08G 59/14; C08L 63/04
[52] U.S. Cl. .................... 525/528; 525/524; 525/930
[58] Field of Search .................... 525/930, 528, 524

[56] References Cited

U.S. PATENT DOCUMENTS

| 3,321,549 | 5/1967 | Barth | 525/930 |
| 3,395,118 | 7/1968 | Reinking et al. | 525/930 |
| 4,497,938 | 2/1985 | Kordomenos | 525/528 |

FOREIGN PATENT DOCUMENTS 52-72733  6/1977  Japan .................... 525/530

*Primary Examiner*—Wilbert J. Briggs, Sr.
*Assistant Examiner*—Robert E. L. Sellers, II
*Attorney, Agent, or Firm*—Wenderoth, Lind & Ponack

[57] ABSTRACT

The present invention relates to an epoxy-based heat-curing type primer coating composition which is specifically excellent in corrosion resistance and other physical properties. The invention is characterized by using a heat curing type epoxy resin which has incorporated into the resin or admixed therewith a resorcin structure or an epoxy resin having a strong acid so as to give a particular resinous acid value or an epoxy resin amphoterized with alkyleneimine compound.

4 Claims, No Drawings

EPOXY RESINOUS VARNISH ITS PREPARATION AND COATING COMPOSITION CONTAINING THE SAME

FIELD OF INVENTION

The present invention relates to an epoxy resinous varnish and preparation thereof. The invention also concerns a heat curing type coating composition which is based on said resinous varnish and useful as a primer coating with excellent corrosion resistance on various metallic materials.

BACKGROUND OF THE INVENTION

As a method for coating metallic materials as iron plate, galvanized steel sheet, aluminum plate and the like, the socalled 2 coat-2 bake system has generally been used, in which the metallic material, after being subjected to a chemical treatment, is first coated with primer and then with a top-coat. The thus prepared precoat metals have been widely used in various areas, including construction materials, and therefore, are required to have higher order of weathering resistance, corrosion resistance, processability, water resistance or the like. Especially, the abovesaid primer coating should have excellent adherence to both substrate and top-coat, as well as improved processability, corrosion resistance, water resistance, chemical resistance and the like.

Heretofore, as a primer paint, use has generally been made of a heat curing type composition comprising as principal components an epoxy resin of the formula:

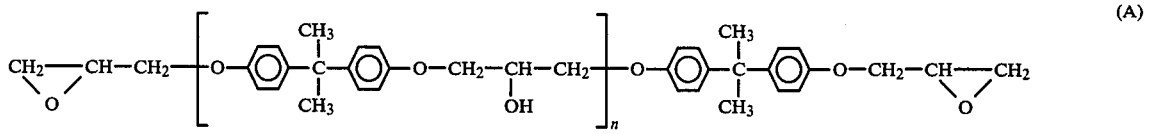

(A)

(wherein n is 0 or an integer of 1 to 14) and amino resin and/or blocked isocyanate compound. Such composition can provide a tough coating with improved corrosion resistance and chemical resistance, and however, has a drawback of poor processability. For the purpose of increasing the processability, attempts have been made to use a high molecular weight epoxy resin or to use polyhydroxy-polyether-polyester obtained by the reaction of relatively lower molecular weight epoxy resin with dicarboxylic acid. However, in the former, indeed corrosion resistance and processability are improved, but additional problems are caused to occur as poor solubility in solvents and poor compatibility with other components of the coating composition. In the latter case, there are certain limitations in the selection of the hardners, because of its relatively poor compatibility with blocked isocyanate compound, and hence cannot exhibit film performance in full in such combination. Furthermore, in the reaction of epoxy resin with dicarboxylic acid, there often occur, besides the addition reaction of glycidyl groups and carboxyl groups, side reactions, i.e. dehydrating condensation of said carboxyl groups and hydroxyl groups originally presented in the epoxy resin or newly generated by the reaction of said glycidyl groups and carboxyl groups thereby resulting the product with many branched chains.

The resinous varnish thus obtained can hardly give the desired processability and in extreme case, the varnish itself, will be gelated thoroughly.

By the adoption of decreased reaction temperature, such phenomena may be avoided, but in that case a prolonged reaction time is required, which is untolerable in commercial production of the intended product. It is, of cause, possible to use a catalyst as tertiary amine, potassium hydroxide, sodium hydroxide, quaternary ammonium salt and the like to shorten the reaction time, and however, in this time, the catalyst used may remain in the produced resin and cause the problems in water resistance and chemical resistance of the coating.

When the following type epoxy resin:

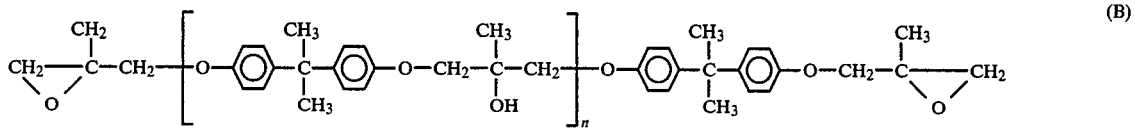

(B)

is used in place of the abovesaid resin (A), the hydroxyl groups contained in the resin and the groups newly generated by the reaction with dicarboxylic acid are all of tertiary nature and hence, there hardly occur the dehydrating condensation of carboxyl groups and hydroxyl groups.

Therefore, the desired polyhydroxy-polyether-polyester may be comparatively stably prepared. However the tertiary nature of the hydroxyl groups in the final resin will also give a difficult question of inferior reactivity with the functional groups of amino resin and/or blocked isocyanate compound, and therefore, a higher temperature baking is essential for the thorough crosslinking and, which is undesired from an economical and operational point of views.

Heretofore, has also been reported a heat curing type epoxy resin for primer use (Japanese Patent Application Kokai No. 30717/82).

This resin is prepared by the interaction of (1) the reaction product of epi-bis type epoxy resin (A) and/or (B), dicarboxylic acid and secondary amine with primary hydroxyl group, and (2) the reaction product of polyisocyanate compound and isocyanate blocking agent.

The abovesaid secondary amine may act as a catalyst for the addition reaction of glycidyl group of the epoxy resin and carboxyl group of the dicarboxylic acid, thereby enabling the reaction to proceed at a lower temperature and at a higher speed, and also have the role of introducing primary hydroxyl groups in the resin, thereby facilitating the progression of crosslinking reaction when compounded with hardener.

Therefore, the coating composition based on such resin, may give combination of excellent as adherence, processability, corrosion resistance, water resistance, and chemical resistance, and is quite useful as primer coating for metallic materials. However, with the diversification of needs, the appearance of primer paint capable of showing far improved adherence, bending property and especially corrosion resistance at processed portions has been longed for.

In a series of studies of having improved epoxy type primer coat, especially with respect to corrosion resistance, the inventors have found that in the heat curing type epoxy resin obtained by the interaction of the reaction product of epoxy resin, dicarboxylic acid and primary hydroxy bearing secondary amine, and the reaction product of polyisocyanate compound and isocyanate blocking agent, the adherence, bending property and corrosion resistance of the coating are greatly improved by the use of epoxy resin with a resorcin structure as a part of said epoxy resin or by combining the abovesaid heat curing type epoxy resin with polyether resin with a resorcin structure, and in a conventional type epoxy resin, the corrosion resistance of the coating can be greatly improved by the inclusion of particular acid in said epoxy resin in state capable of developing particular resinous acid value or by converting the epoxy resin to an amphoteric type through the reaction with polybasic acid and particular alkyleneimine compound. On the basis of these findings, the invention has been made.

SUMMARY OF THE INVENTION

According to the first invention, there is provided a primary coating composition comprising as essential components, 50~95 parts by weight of a heat curing epoxy resin [C], prepared by the interaction of product [A] obtained by the reaction of epoxy resin component ($a_1$) which is a mixture of 50~100% by weight of the resin:

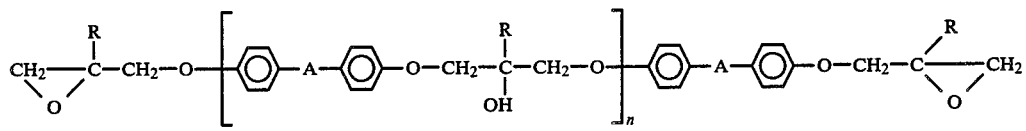

and 50~0% by weight of another epoxy resin, a dicarboxylic acid ($a_2$) and a secondary amine having at least one primary hydroxy alkyl group ($a_3$), and product [B] prepared by the reaction of polyisocyanate compound ($b_1$) and isocyanate blocking agent ($b_2$), the ratio of isocyanate groups in ($b_1$) to active hydrogen atoms in ($b_2$) being 5/1~5/4 and the ratio of primary hydroxyl groups contained in product [A] to free isocyanate groups contained in product [B] being 10/1~1/1, 50~5 parts by weight of polyester resin [D] having the repeating unit of the formula:

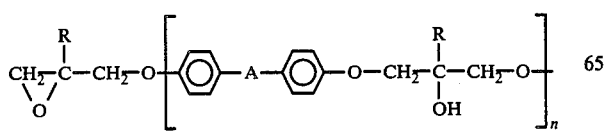

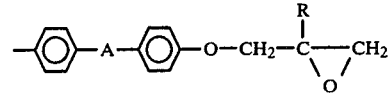

(wherein R is H or $CH_3$, —A— represents >$C(CH_3)_2$, —$CH_2$—, —O— or —S—, and n is 0 or an integer of 1~14) and 50~0% by weight of another epoxy resin, a dicarboxylic acid ($a_2$) and a secondary amine having at least one primary hydroxy alkyl group ($a_3$), and product [B] prepared by the reaction of polyisocyanate compound ($b_1$) and isocyanate blocking agent ($b_2$), the ratio of isocyanate groups in ($b_1$) to active hydrogen atoms in ($b_2$) being 5/1~5/4 and the ratio of primary hydroxyl groups contained in product [A] to free isocyanate groups contained in product [B] being 10/1~1/1, 50~5 parts by weight of polyester resin [D] having the repeating unit of the formula:

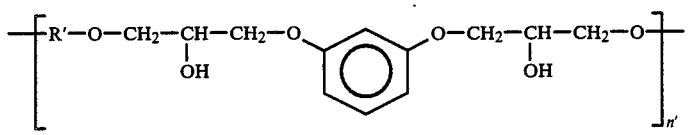

wherein R' is

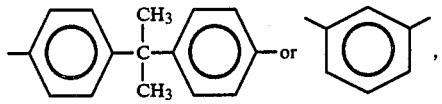

and, n' is 0 or an integer of 1~14, and

1~30 parts by weight of crosslinking agent.

In the second invention, the is provided an epoxy resin varnish for primer coating use which is prepared by the reaction of product [A'] obtained by the reaction of an epoxy resin component ($a_1$) comprising 0~95% by weight of the resin represented by the formula:

(wherein R is H or $CH_3$, —A-represents >$C(CH_3)_2$, —$CH_2$—, —O—, —S— or —$SO_2$—, and n is 0 or an integer of 1~14) and 100~5% by weight of the resin

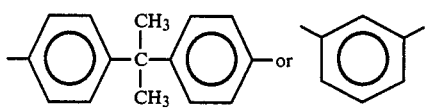

and n' is 0 or an integer of 1–14,
dicarboxylic acid (a₂) and secondary amine bearing at least one primary hydroxyalkyl group (a₃), and the product [B] obtained by the reaction polyisocyanate compound (b₁) and isocyanate blocking agent (b₂), the ratio of isocyanate groups in (b₁) to active hydrogen atoms in (b₂) being 5/1~5/4, and the ratio of primary hydroxyl groups in product [A] to free isocyanate groups in product [B] being 10/1~1/1.

The invention also provide a resinous composition comprising a polybasic acid modified epoxy resin or a mixture of such modified epoxy resin and unmodified epoxy resin, the said polybasic acid showing a midpoint potential of more than −300 mV in non-aqueous potentiometric titration, under state capable of developing resinous acid value, and the resinous acid value based on said polybasic acid in final resin being 0.1~50.

The invention further provides a resinous composition containing at least part of resinous components an amphoterized epoxy resin obtained by reacting an epoxy resin with a polybasic acid and then an alkylene imine compound having at least one $C_2$~$_3$ alkylene imine ring, the amount of said alkylene imine compound being equivalent to a resinous acid value of 0.1~20 and the resinous acid value being 0.1~30.

PREFERRED EMBODIMENTS OF THE INVENTION

In the first invention, the heat curing epoxy resin stated in Japanese Patent Application Kokai No. 30717/82 is used as it is. That is, the said epoxy resin can be prepared by the interaction of product [A] which is obtained by the reaction of (a₁) epoxy resin component which is a mixture of 50~100% by weight of epoxy resin represented by the formula

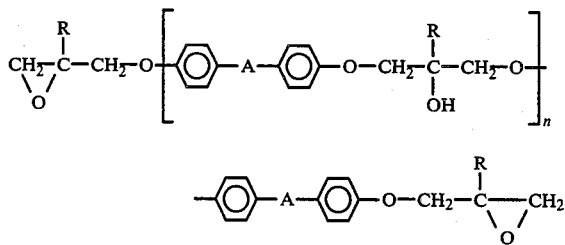

(wherein R is H or CH₃, —A— represents >C(CH₃)₂, —CH₂—, —O—, —S— or —SO₂—, and n is 0 or an integer of 1~14), and 50~0% by weight of another epoxy resin,
(a₂) dicarboxylic acid and
(a₃) secondary amine having at least one primary hydroxyalkyl group,
and product [B] which is obtained by the reaction of
(b₁) polyisocyanate compound and
(b₂) isocyanate blocking agent,
the ratio of isocyanate groups in (b₁) to active hydrogen atoms in (b₂) being 5/1~5/4, and the ratio of primary hydroxyl groups in product [A] to free isocyanate groups in product [B] being 10/1~1/1.

As the epoxy resin component (a₁), the resin of the aforesaid formula may be used alone. Examples of such epoxy resins are commercialized Epotohto YD-017, YD-014, YD-011, YD-128 (Trade Mark, manufactured by Toto Kasei K.K.), Epicron 4050 (Trade Mark, manufactured by Dainippon Ink Chem. Ind. Ltd.) and the like. The said resin component (a₁) may further include other epoxy resin (e.g. polyalkyleneglycoldiglycidylether and the like) in an amount of less than 50% by weight of the total epoxy resin. If the amount of said additional resin exceeds over 50% by weight of the epoxy resin component (a₁), the reason has a tendency to decrease in the desired properties, such as corrosion resistance, water resistance, adherence chemical resistance, hardening properties and the like.

Examples of said dicarboxylic acid component (a₂) are polymethylenedicarboxylic acids (e.g. adipic acid, azelaic acid, sebacic acid and the like), aromatic dicarboxylic acids (e.g. phthalic anhydride, phthalic acid, isophthalic acid, terephthalic acid and the like), dimer acid, polybutadiene dicarboxylic acids, polyester dicarboxylic acids and the like.

One or combination of two and more of these acids may be used as component (a₂), and however, special preference is given to polymethylene dicarboxylic acids and especially azelaic acid because of resulting resinous material with excellent processability, solubility and compatibility and the like.

Trivalent carboxylic acids may be caused with the said a₂ component, if desired.

In the present invention, the abovementioned secondary amine (a₃) has the role of a catalyst which proceeds with the reaction between a₁ and a₂ components, i.e. addition reaction between glycidyl group and carboxyl group, at a lower temperature and at a higher speed.

Futhermore, the primary hydroxyl group can be introduced into the resin through the reaction of the —NH moiety with glycidyl group, which is very important for the crosslinking reaction of the coating. Also, the nitrogen incorporated into the resinous structure may act as an effective catalyst for the curing reaction.

Examples of such secondary amines are dialkanolamines (e.g. diethanolamine, dipropanolamine, dibutanolamine and the like), and alkylalkanolamines (e.g. ethylethanolamine and the like). These amines are used singularly or combination of two and more. Particularly preferable amines are dialkanolamines and especially ethanolamine.

The product [A] may be obtained by the reaction of the abovesaid epoxy resin component (a₁) with the dicarboxylic acid (a₂) and the secondary amine (a₃). The reaction rates of the respective components are, usually selected so that the rate of [gram equivalent of glycidyl group in (a₁)-gram equivalent of carboxyl group in (a₂)] to [total weight (g) of (a₁)+(a₂)+(a₃)] is less than $7 \times 10^{-4}$ gram equivalent/gram, preferable $4 \times 10^{-4}$~$0.3 \times 10^{-4}$ gram equivalent/gram, and the rate of [gram equivalent of carboxyl group in (a₂)+-gram equivalent of amino group in (a₃)]/[gram equivalent of glycidyl group in (a₁)] is 4/5~6/5, preferable 9/10~23/20.

If the former rate exceeds above $7 \times 10^{-4}$ gram equivalent/gram, sufficient processability cannot be obtained. If the latter rate is lower than the lowest limit of 4/5, there is a trend such that sufficient heat curing cannot be obtained and furthermore if it exceeds the upper limit of 6/5, the unreacted dicarboxylic acid or secondary amine will remain in the product, thereby causing inferior water resistance and chemical resistance of the coating.

In carrying out the reactions of the $a_1 \sim a_3$ components, it is generally recommended that the $a_1$ component be first melted or dissolved in an appropriate inert solvent, the $a_2$ and $a_3$ components are added and the mixture is reacted under a nitrogen gas stream at $80° \sim 200°$ C. for $1 \sim 15$ hours. At this time, the secondary amine ($a_3$) can exhibit the role of an esterification catalyst for the reaction between the $a_1$ and $a_2$ components, and therefore, preference is given to such reactions under the conditions that the abovesaid three components co-exist with each other.

The product [B] used in the present invention can be obtained by the reaction of the polyisocyanate compound ($b_1$) and the isocyanate blocking agent ($b_2$) in the ratio of isocyanate groups in ($b_1$) to active hydrogen atoms in ($b_2$) of $5/1 \sim 5/4$. This reaction is usually carried out, with or without using solvent, at room temperature $\sim 150°$ C., and however, it is generally preferred for the control of product quality and reaction rate that the ($b_1$) component be first disolved in an inert solvent and the solution heated to $50° \sim 100°$ C. and then the ($b_2$) component or its solution added dropwise to proceed with the reaction.

As the abovesaid polyisocyanate compound ($b_1$), mentioned is made of aliphatic or alicyclic diisocyanate compounds (e.g. hexamethylene diisocyanate, isophorone diisocyanate, hydrogenated diphenylmethane diisocyanate and the like), aromatic diisocyanate compounds (e.g. tolylenediisocyanate, diphenylmethane-4,4'-diisocyanate and the like), and triisocyanate compounds are aliphatic or alicyclic diisocyanate compounds because of resulting excellent solubility, compatibility and processability.

The abovesaid isocyanate blocking agent ($b_2$) must be a member capable of reacting with an isocyanate group of the $b_1$ component to give a product which is stable at a room temperature, but which will decompose at an elevated temperature of $140° \sim 250°$ C., thereby regenerating free isocyanate group.

Examples of such protective agents ($b_2$) are lactam series agents (e.g. ε-caprolactam, γ-butyrolactam and the like), oxim series agents (e.g. methyl ethyl ketoxim, cyclohexanone oxim and the like), alcoholic agents (e.g. methanol, ethanol, isobutyl alcohol and the like), phenolic agents (e.g. phenol, p-t-butylphenol, cresol and the like).

The product [B] to be obtained by the reaction of $b_1$ and $b_2$ components may be the mixture of a completely blocked polyisocyanate compound, a partly blocked polyisocyanate compound and an unblocked polyisocyanate compound. Among them, the completely blocked polyisocyanate compound may act as a crosslinking agent at the time of film forming stage of the present heat curing type resin.

The polyisocyanate compound having one free isocyanate and one and more of blocked isocyanate groups may undergo addition to the product [A] and can exhibit the role of crosslinking functional groups at the film-forming stage.

The polyisocyanate compound having 2 and more free isocyanate and 1 and more blocked isocyanate groups may function as the growing chain of the product [A] and also of a crosslinking functional group. The unblocked polyisocyanate compound can play the role of a growing chain for the product [A], thereby increasing the molecular weight and also introducing urethane bondings in the main chain.

In the present invention, the abovesaid product [A] and product [B] are reacted to give the desired heat curing epoxy resin. At this time, the reactants are selected so that the rate of primary hydroxyl groups contained in product [A] to free isocyanate groups contained in product [B] is in a range of $10/1 \sim 1/1$, preferable $5/1 \sim 5/4$.

The abovesaid reaction is usually carried out under nitrogen gas at a temperature of $50° \sim 150°$ C. until the isocyanate groups are substantially disappeared. If desired, the reaction may be stopped at the stage where a certain amounts of isocyanate are still remained but the desired molecular weight has been attained, by, for example, adding primary alcohol to the reaction system.

With the abovesaid urethane modified epoxy resin, the invention is characterized by using polyhydroxypolyether resin having the repeating unit of the formula:

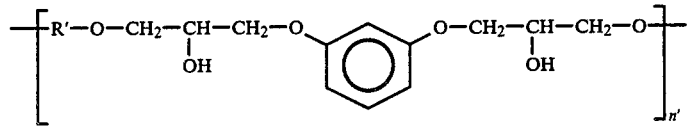

wherein n' has the meaning as previously defined. The said resin may be easily prepared by reacting resorcin or mixture of resorcin and bisphenol A with epihalohydrine in the presence of catalyst or reacting diepoxide, derived from resorcin or bisphenol A and epihalohydrine, with resorcin in the presence of catalyst (see Japanese Patent Application No. 179934/80) or easily available in the market, as, for example, ESRP-250, ESAR-004, ESAR-007, ESRA-004 and the like (Trade Marks, manufactured by Sumitomo Chem. Co., Ltd.). In the case the polyhydroxy-polyether resins has the following formula:

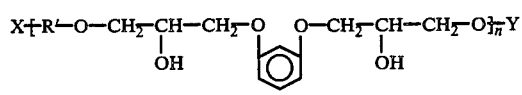

wherein
X represents

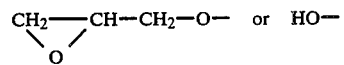

and
Y represents and 100~5% by weight of an epoxy resin of the formula:

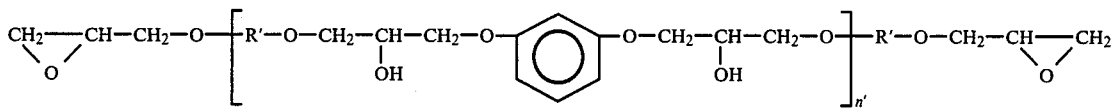

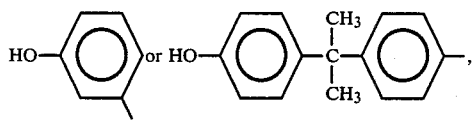

and
wherein
R' and n' have the same meaning as previously defined.

In the present invention, 50~95 parts by weight of the abovesaid urethane modified epoxy resin are combined with 50~5 parts by weight of the said polyhydroxy-polyester resin. If the latter is less than 5 parts by weight, it is unable to attain the improvements in adherence at the processed portions and bending property. Futhermore, no satisfactory corrosion resistance at the processed portions can be attained.

The crosslinking agents used in the invention are of conventional type having functional groups capable of reacting with hydroxyl groups in said epoxy and polyether resins.

Examples of the crosslinking agents are melamine-formaldehyde resin, phenol-formaldehyde resin, urea-formaldehyde resin, polyisocyanate, blocked polyisocyanate and the like. Such agents are generally used in an amount of 1~30 parts by weight, and however, may vary in considerably wider range, depending on the curing degree desired.

In formulating a coating composition, the abovesaid components are merely mixed together in each defined rate, and no particular operations are required therefor.

In the second aspect of the invention, is provided a heat curing type epoxy resin varnish, being useful as resinous binder in a primer coating composition with improved corrosion resistance, which is prepared by the reaction of product [A'] obtained by the reaction of
(a₁) an epoxy resin component composed of 0~95% by weight of epoxy resin of the formula:

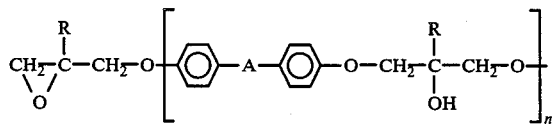

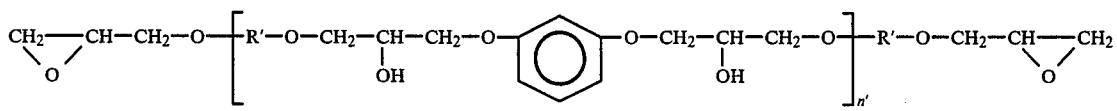

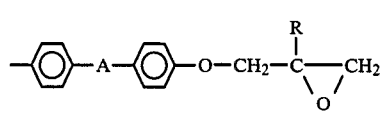

wherein R is H or CH₃, —A— represents >C(CH₃)₂, —CH₂—, —O—, —S— or —SO₂—, and n is 0

10 wherein R' is

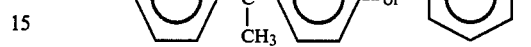

and n' is 0 or an integer of 1~14,
(a₂) a dicarboxylic acid, and
(a₃) a secondary amine having at least one primary hydroxyalkyl group, and product [B]' obtained by the reaction of
(b₁) a polyisocyanate compound and
(b₂) an isocyanate blocking agent,
the ratio of isocyanate groups in (b₁) to active hydrogen atoms in (b₂) being 5/1~5/4 and the ratio of primary hydroxyl groups in product [A'] to free isocyanate groups in product [B]' being 10/1~1/1.

In the first invention, a resorcin type or a bisphenol A-resorcin alternating co-condensation type unit structure is incorporated into the coating composition in thee form of a separate polyether resin to be blended with the epoxy resin. However, in the second invention, such characteristic unit structure is incorporated into a part of the epoxy resin itself.

Thus, in the second invention, the epoxy resinous component (a₁) is composed of 0~95% by weight of epoxy resin of the formula (epibis-type epoxy resin)

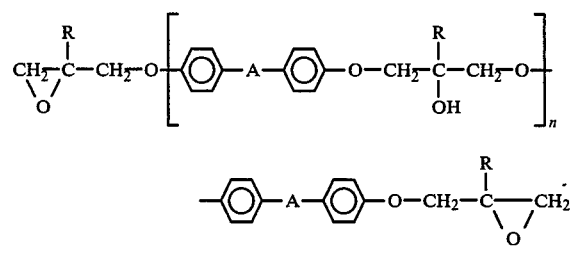

and 100 5% by weight of epoxy resin of the formula (resorcin type or resorcin-epibis alternating type epoxy resin)

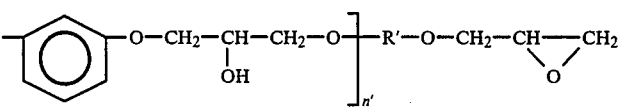

As to the epibis-type epoxy resin, a dicarboxylic acid (a₂), a secondary amine (a₃), a polyisocyanate compound (b₁) and an isocyanate blocking agent (b₂) components, which one very similar members to those stated previously in connection with the first invention are satisfactorily used.

Examples of the resorcin type or resorcin-bisphenol A alternating type epoxy resins, are ESAR-004, ESAR- 007, ESRA-004, ESR-004, ELR-130 (Trade Marks, manufactured by Sumitomo Chem. Co., Ltd).

The invention has been made on the basis of the finding that the very similar improvement in corrosion resistance of the heat curing type epoxy resin varnish can be attained even when the resorcin structure is incorporated into the epoxy resin itself, in place of a polyether resin to be blended with said epoxy resin.

The final object of the invention is, already stated, to provide a primer coating composition capable of showing extremely improved corrosion resistance and especially corrosion resistance at the pocessed portions.

In the first and the second inventions, the said object has been attained by providing a heat curing type epoxy resin and by incorporating this resin into the resinous varnish the resorcin structure in the form of a separate polyether resin and in the form of a particular epoxy resin.

The inventors have further continued studies and have surprisingly found that the same object could be attained without the necessity of making a particular heat curing type epoxy resin anew and by merely modifying the conventional epoxy resin with a particular acid or by converting the same to an amphoteric type resin.

Thus, in the third aspect of the invention, there is provided an epoxy resinous varnish which is useful as a resinous vehicle for a primer coating composition with improved corrosion resistance, which comprises a polybasic acid modified epoxy resin or a mixture of such modified epoxy resin and an unmodified epoxy resin, the said polybasic acid showing a titration midpoint potential of more than $-300$ mV in a non-aqueous potentiometric titration, under a state capable of developing a resinous acid value, wherein the resinous acid value based on said polybasic acid in the final resin is $0.1 \sim 50$.

In the fourth aspect of the invention, there is provided an epoxy resinous varnish being useful as a resinous vehicle for a primer coating composition with improved corrosion resistance, which comprises, as at least part of resinous components, an amphoterized epoxy resin obtained by reacting an epoxy resin with a polybasic acid and then with an alkyleneimine compound having at least one $C_2 \sim C_3$ alkyleneimine ring, the amount of said alkyleneimine compound being equivalent to a resinous acid value of $0.1 \sim 20$, and the resinous acid value being $0.1 \sim 30$. In the present specification and claims, the term "under the state capable of developing resinous acid value" denotes a polybasic acid under the state being incorporated into the resin.

The term "non-aqueous potentiometric titration" means "a potentiometric titration wherein the test resin is dissolved in an non-aqueous solvent and wherein n-tetra-butylammonium hydroxide (TBAH) is used as titration reagent."

The term "epoxy resin" shall mean "an epoxy resin obtained by the reaction of a compound having a phenolic hydroxyl group and an epihalohydrine, and modified epoxy resins obtained by the reactions of said epoxy resin with polybasic acid, polyhydric alcohol, amine, isocyanate compound or the like.".

As is well known, an epoxy resin has both epoxy groups and hydroxyl groups being of great polarity and distributed at a defined distance throughout the molecular chain. Therefore, when reacted with acid or acid anhydride, the said acid component may be incorporated into the resin through the reaction with said epoxy and hydroxyl groups. If a polybasic acid is used as the said acid, free carboxyl groups derived from said polybasic acid may be introduced in the resin and resinous acid value would be developed therefrom.

In the present invention, as the polybasic acid to be reacted with the epoxy resin, use is made of such member which has titration midpoint potential of more than $-300$ mV in a non-aqueous potentiometric titration under the state capable of developing a resinous acid value.

When a potential —TBAH titer curve of a polybasic acid is made from the results of its non-aqueous potentiometric titration, there is shown a plural number of inflection points depending on the type of the acid used. However, at the state when the acid is incorporated into the resin by ester bonding, since there remains at least one free carboxyl group, the said inflection points will naturally decease, accordingly.

In this invention, the polybasic acid to be used and incorporated into a resin must be of such acidity that the titration midpoint potential in a non-aqueous potentiometric titration be more than $-300$ mV, under the state of being incorporated into the resin.

Examples of such polybasic acids are phthalic anhydride, isophthalic acid, pyromellitic acid, pyromellitic anhydride, trimellitic acid, trimellitic anhydride, tetrachlorophthalic anhydride, tetrabromophthacid acid, Het acid, Het anhydride and the like.

The inventors have found that if the abovesaid epoxy resin modified with a particular acid is included as at least part of the epoxy resinous component and if the resinous acid value based on the carboxyl groups of the abovesaid particular polybasic acid incoporated into the resin is in the range of $0.1 \sim 50$, preferable $0.1 \sim 20$, and most preferably $0.1 \sim 10$, in a whole resinous composition, the corrosion resistance of the cured epoxy coating can be markedly improved.

The invention had been made on the basis of this finding.

That is, in a resinous composition containing as the sole epoxy resin component the abovesaid acid modified resin, the amount of said polybasic acid to be incorporated into the resin should be as much as being sufficient to give the resinous acid value of $0.1 \sim 50$. Whereas, in a resinous composition containing a mixture of unmodified and modified epoxy resins, the amount of said polybasic acid for modification use is substantially larger than the level required for giving the resinous acid value of $0.1 \sim 50$ and in this invention, it is essential that as the whole resinous components, the resinous acid value based on the carboxyl groups of said particular polybasic acid should be in the range of $0.1 \sim 50$.

If the said resinous acid value is deficient to the lowest limit of 0.1, there is no substantial improvement in the corrosion resistance, whereas at an excessively larger level of more than 50, there is a trend such that undesirable effects will be produced in respect to water resistance, chemical resistance or the like.

In the fourth invention, an epoxy resin is converted to an amphoteric type resin by the reaction with a polybasic acid and then with an alkyleneimine compound having at least one $C_2 \sim C_3$ alkyleneimine ring.

However, in this case, the content of the alkylene imine compound should be in a level corresponding to resinous acid value of $0.1 \sim 20$ and the resinous acid value of the composition should be in a range of $0.1 \sim 30$.

If the alkyleneimine content is less than a level which is equivalent to a resinous acid value of 0.1, the object of the invention, i.e, the improvement in corrosion resistance, cannot be attained, whereas, if it exceeds a level equivalent to a resinous acid value of 20 and/or if the resinous acid value exceeds 30, undesirable effects recur in regard to weather resistance, water resistance and the like and improvement in corrosion resistance cannot be attained.

The present resinous varnishes as defined, in the second to the fourth inventions are usually combined with an aminoplast or an isocyanate compound to formulate the coating compositions, which are especially useful as primer coatings with improved corrosion resistance.

The invention shall be now more fully explained in the following examples. Unless otherwise being stated, parts and percentage are all by weight.

SYNTHETIC EXAMPLE 1

784 Parts (parts by weight hereinafter the same) of Epotohto YD-017 (Trade mark epoxy resin manufactured by Toto Kasei K K., epoxy equivalent 1960) were dissolved in a mixture of 78.4 parts of xylene and 196 parts of Cellosolve acetate and the mixture was added with 25.1 parts of azelaic acid and 13.3 parts of diethanolamine and reacted at 140° C. under nitrogen atmosphere, for 4.5 hours. At the stage when the acid value of the resin reached to 1.2 KOH mg/g, 314 parts of xylene and 245 parts of methylethyl ketone were added and the mixture was allowed to cool to obtain product A-1.

In a separate vessel, were placed 375 parts of Cellosolve acetate, 224 parts of hexamethylene diisocyanate and 151 parts of $\epsilon$-caprolactam, and the mixture was reacted at 100° C. for 3 hours to obtain product B-1 having an isocyanate equivalent of 562 g.

Next, to the product A-1, 75.0 parts of the product B-1 and 263 parts of xylene were added and the mixture was reacted under nitrogen gas stream at 100° C. for 3 hours. At this stage it was found that isocyanate absorption was disappeared in an infrared absorption analysis, and therefore the mixture was added with 194 parts of methylethyl ketone and allowed to cool to obtain a heat curing type resinous solution.

SYNTHETIC EXAMPLE 2

475 parts of Epotohto YD-014 (Trade Mark, epoxy resin manufactured by Toto Kasei K.K., epoxy equivalent 950) were dissolved in a mixture of 95 parts of xylene and 119 parts of Cellosolve acetate and the mixture was added with 39.2 parts of azelaic acid and 8.3 parts of diethanolamine and reacted at 145° C. for 6 hours. At the stage when the resinous acid value reached to 1.1 KOH mg/g, 209 parts of xylene and 130 parts of methyl ethyl ketone were added and the mixture was allowed to cool to obtain product A-2.

In a separate vessel, were added 222 parts of isophoron diisocyanate and 222 parts of Cellosolve acetate and the mixture was heated to 80° C. Thereafter, a solution of 113 parts of -caprolactam and 113 parts of Cellosolve acetate was dropped in over 1 hour. After completion of said addition, the reaction was continued at 80° C. for additional 3 hours to obtain product B-2 whose isocyanate eqivalent was 670 g.

Next, to the product A-2, 55.9 parts of the product B-2 and 118 parts of Cellosolve acetate were added and the mixture was reacted at 100° C. for 3 hours. Then 127 parts of isopropyl alcohol were added and the mxiture was allowed to cool to obtain a heat curing type resinous solution.

SYNTHETIC EXAMPLES 3 TO 6

The same procedures as stated in Synthetic Examples 1 to 2 were repeated excepting using the materials shown in the following Table 1. Heat curing type resinous solutions (non-volatile content 40%) were obtained.

EXAMPLES 1 TO 6

To each 200 parts of the heat curing type resinous solutions stated in Synthetic Examples 1 to 6, were added 100 parts of ESRP-250 (polyether resin solution, solid content 20 wt%, Trade mark, manufactured by Sumitomo Chemical Co. Ltd.). To them, each 30 parts of rutile type titanium dioxide and 25 parts of strontium chromate were added and the mxitures were kneaded well with three rolls mill. Finally, 10 parts of Cymel 303 (methoxy methylated melamine, manufactured by ACC) were added to obtain primer coating compositions.

COMPARATIVE EXAMPLES 1 TO 2 AND EXAMPLES 7 TO 8

Using the materials shown in Table 1, the same procedures as stated in Example 1 were repeated to obtain primer coating compositions, respectively.

EXAMPLE 9

To heat curing type resinous solution of Synthetic Example 1, ESRP-250 was added. Then rutile type titanium dioxide and strontium chromate were added and the mixture was kneaded well with three rolls mill. Finally, urea-formaldehyde resin (Beckamine G-1850, manufactured by Dainippon Ink K.K., non-volatile content 60%) were added to obtain a primer coating composition.

EXAMPLE 10

To 200 parts of heat curing type resinous solution obtained in Synthetic Example 1, were added 100 parts of ESRP-250 and then 30 parts of rutile type titanium dioxide and 25 parts of strontium chromate and the mixture was kneaded well in three rolls mill. 10 Parts of isophorone diisocyanate blocked with $\epsilon$-caprolactam were added thereto to obtain a primer coating composition.

EXAMPLES 11 TO 12

The same procedures as stated in Example 10 were repeated excepting using methoxymethylated melamine in each amount indicated in Table 1 to obtain primer coating compositions.

Test results

The primer coating compositions stated in Examples 1 to 12 and Comparative Examples 1 to 2 each was applied under conditions mentioned below and thus obtained coatings were evaluated as follow:
Substrate: Zinc phosphate pre-treated galvanized steel plate
Primer baking condition: 210° C.×45 sec.
Primer thickness: 8 microns
Top coat baking condition: 210° C.×60 sec.
Top coat thickness: 15 microns
For the said top coat, commercially available coil coating composition was used and for the evaluation of corrosion resistance at the processed portions, was used a method wherein 4T bended sample was salt sprayed for 200 hours and then subjected to tape peeling test. The results are shown in Table 1.

In that Table,

Note 1: Epotohto YD-011 and YD-128 are epoxy resins manufactured by Toto Kasei K.K., epoxy equivalent 476 and 188 respectively Note 2: Dimer acid (carboxyl equivalent 289)

Note 3: Pencil scratching test by a standardized JIS-K5400 method

Note 4: Cross-cut test by a standardized JIS-5400 method
- ⊙ 100/100—95/100
- ○ 94/100—80/100
- Δ 79/100—60/100
- X 59/100—0/100

Note 5: Tape peeling test at the bended portion
- ⊙ no peeling at all
- ○ slight peeling
- Δ almost one half peeling
- X almost complete peeling Note 6: Test piece was cutted-in to the substrate and subjected to salt spraying by using salt sprayer (JIS-Z-2371) for 500 hours. Thereafter, tape peeling test was carried out at the cut-in portion. width of peeling
- ⊙ 0–1.0 mm
- ○ 1.1–2.0 mm
- Δ 2.1–3.0 mm
- X more than 3.1 mm Note 7: 4T bended test piece was salt sprayed by JIS-Z-2371 for 200 hours and then subjected to tape peeling test
- ○ no peeling
- ⊙ slight peeling
- Δ almost one half peeling
- X almost complete peeling

TABLE 1

| Example | 1 | 2 | 3 | 4 | 5 | 6 | Comp. Ex. 1 | 7 |
|---|---|---|---|---|---|---|---|---|
| heat curing resin (Synth. Example No.) | 1 | 2 | 3 | 4 | 5 | 6 | 1 | 1 |
| Resinous composition | | | | | | | | |
| Epotohto YD-017 | 784 (5) | | 784 (5) | | | | 784 | 784 |
| Epotohto YD-014 | | 475 (5) | | | | 295(5) | | |
| Epotohto YD-011*1 | | | | 476 (5) | | | | |
| Epotohto YD-128 | | | | | 245 (5) | | | |
| dibasic acid | azelaic acid | azelaic acid | sebacic acid | azelaic acid | azelaic acid | dimer acid*2 | azelaic acid | azelaic acid |
| its amount | 25.1 (3.34) | 39.2 (4.17) | 27.0 (3.34) | 86 (4.57) | 117 (4.77) | 75 (4.18) | 25.1 | 25.1 |
| diethanolamine | 13.4 (1.6) | 8.3 (0.8) | 13.4 (1.6) | 8.3 (0.30) | 6 (0.22) | 5.2 (0.80) | 13.4 | 13.4 |
| (B-1) | 75.0 (1.66) | | 75.0 (1.66) | 66.2 (0.45) | | | 75.0 | 75.0 |
| (B-2) | | 55.9 (0.83) | | | 44.7 (0.26) | 39 (0.94) | | |
| coating composition | | | | | | | | |
| heat curing resin. sol. | 200 | 200 | 200 | 200 | 200 | 200 | 240 | 230 |
| hydroxypolyether res. sol. | 100 | 100 | 100 | 100 | 100 | 100 | 20 | 40 |
| solid ratio of heat cur. resin/hydroxy polyether resin | 80/20 | 80/20 | 80/20 | 80/20 | 80/20 | 80/20 | 96/4 | 92/8 |
| crosslinking agent | Cymel-303 | Cymel-303 | Cymel-303 | Cymel-303 | Cymel-303 | Cymel-303 | Cymel-303 | Cymel-303 |
| its amount | 10 | 10 | 10 | 10 | 10 | 10 | 10 | 10 |
| total resin/crosslink. agent | 100/10 | 100/10 | 100/10 | 100/10 | 100/10 | 100/10 | 100/10 | 100/10 |
| Test results | | | | | | | | |
| pencil hardness*3 | 2 H | 3 H | 2 H | 2 H | 2 H | 2 H | 3 H | 3 H |
| cross-cut tape peeling*4 | ⊙ | ⊙ | ⊙ | ⊙ | ⊙ | ⊙ | ⊙ | ⊙ |
| **bend. tape peeling*5** | | | | | | | | |
| 1T | ○ | ⊙ | ⊙ | ⊙ | ⊙ | ⊙ | Δ | ○ |
| 2T | ⊙ | ⊙ | ⊙ | ⊙ | ⊙ | ⊙ | ○ | ⊙ |
| salt spray test | | | | | | | | |
| 500 hrs tape peeling at cross-out portion*7 | ⊙ | ⊙ | ⊙ | ⊙ | ○ | ○ | ⊙ | ⊙ |
| 200 hrs tape peeling at bend. portion*8 | ⊙ | ⊙ | ⊙ | ⊙ | ⊙ | ⊙ | X | ○ |

| Example | 8 | Comp. Ex. 2 | 9 | 10 | 11 | 12 |
|---|---|---|---|---|---|---|
| heal curing resin (Synth. Example No) | 1 | 1 | 1 | 1 | 1 | 1 |
| Resinous composition | | | | | | |
| Epotohto YD-017 | 784 | 784 | 784 | 784 | 784 | 784 |
| Epotohto YD-014 | | | | | | |
| Epotohto YD-011*1 | | | | | | |
| Epotohto YD-128 | | | | | | |
| dibasic acid | azelaic acid | azelaic acid | azelaic acid | azelaic acid | azelaic acid | azelaic acid |
| its amount | 25.1 | 25.1 | 25.1 | 25.1 | 25.1 | 25.1 |
| diethanolamine | 13.4 | 13.4 | 13.4 | 13.4 | 13.4 | 13.4 |
| (B-1) | 75.0 | 75.0 | 75.0 | 75.0 | 75.0 | 75.0 |
| (B-2) | | | | | | |
| coating composition | | | | | | |
| heat curing resin. sol. | 140 | 105 | 200 | 200 | 200 | 200 |
| hydroxypolyether res. sol. | 220 | 290 | 100 | 100 | 100 | 100 |
| solid ratio of heat cur. resin/hydroxy polyether resin | 56/44 | 42/58 | 80/20 | 80/20 | 80/20 | 80/20 |
| crosslinking agent | Cymel-303 | Cymel-303 | Beckamin* | Blocked NCO | Cymel-303 | Cymel-303 |
| its amount | 10 | 10 | 16.7 | 10 | 5 | 25 |
| total resin/crosslink. agent | 100/10 | 100/10 | 100/10 | 100/10 | 100/5 | 100/25 |

TABLE 1-continued

| Test results | | | | | | |
|---|---|---|---|---|---|---|
| pencil hardness*3 | 2 H | 2 H | 3 H | 3 H | 3 H | 2 H |
| cross-cut tape peeling*4 | ⊚ | ⊚ | ⊚ | ⊚ | ⊚ | ⊚ |
| bend. tape peeling*5 | | | | | | |
| 1T | ⊚ | ⊚ | ○ | ○ | ○ | ○ |
| 2T | ⊚ | ⊚ | ⊚ | ⊚ | ⊚ | ⊚ |
| salt spray test | | | | | | |
| 500 hrs tape peeling at cross-cut portion*7 | ○ | X | ⊚ | ⊚ | ⊚ | ⊚ |
| 200 hrs tape peeling at bend. portion*8 | ○ | Δ | ⊚ | ⊚ | ⊚ | ⊚ | all figures are parts by weight. ( ) shows euqivalent ratio
*Beckamine G-1850

EXAMPLE 13

475 Parts of ESAR-004 (epoxy resin having an epoxy eqivalent of 950, Trade Mark, manufactured by Sumitomo Chem. Co. Ltd.) were dissolved in a mixture of 95 parts of xylene and 119 parts of Cellosolve acetate and to this, were added 39.2 parts of azelaic acid and 8.3 parts of diethanolamine. The mixture was reacted, under nitrogen gas stream, at 145° C. for 6 hours. At the stage when the resinous acid value reached to 1.1 KOH mg/g, the mixture was added with 130 parts of methyl ethyl ketone and allowed to cool to obtain product A'-1.

In a separate vessel, 222 parts of isophorone diisocyanate were dissolved in 222 parts of Cellosolve acetate and after heating to 80° C., a solution of 113 parts of ε-caprolactam and 113 parts of Cellosolve acetate was dropwise added to the said solution over 1 hour. After completion of said addition, the mixture was maintained at 80° C. and reacted for 3 hours to obtain product B'-1 having an isocyanate equivalent of 670 g. To the said product A'-1, 55.9 parts of the product B'-1 and 118 parts of Cellosolve acetate were added and the mixture was reacted at 100° C. for 3 hours. Thereafter, 127 parts of isopropyl alcohol were added and the mxiture was allowed to cool to obtain a heat curing type resinous solution. The materials used for the synthesis of this resin and varnish characteristics are shown in the following Table 2.

EXAMPLE 14

648 Parts of ESAR-007 (epoxy resin having an epoxy equivalent of 1620, Trade mark, manufactured by Sumitomo Chem. Co., ltd.) were dissolved in a mixture of 55.6 parts of xylene and 139 parts of Cellosolve acetate and to this were added 25.1 parts of azelaic acid and 13.3 parts of diethanolamine and the mixture was reacted under nitrogen gas atmosphere at 145° C. for 8 hours. At the stage when the resinous acid value reached to 1.2 KOH mg/g, the mixture was added with 222.8 parts of xylene and 173.8 parts of methyl ethyl ketone and allowed to cool to obtain product A'-2. Separately, to 375 parts of Cellosolve acetate, were added 224 parts of hexamethylene diisocyanate and 151 parts of ε-caprolactam and the mixture was reacted at 100° C. for 3 hours to obtain product B'-2 having an isocyanate euqivalent of 562 g. Next, to the product A'-2, 75 parts of the product B'-2 and 263 parts of xylene were added and the mixture was reacted under nitrogen gas stream at 100° C. for 3 hours. After confirming that no isocyanate absorption was detected by infra-red absorption analysis, the reaction mixture was added with 194 parts of methyl ethyl ketone to obtain a heat curing type resinous solution. The materials used for the synthesis of this resin and varnish characteristics are shown in the following Table 2.

EXAMPLES 15 TO 19 AND COMPARATIVE EXAMPLES 3 TO 5

The same procedures as stated in Example 13 were repeated excepting using the materials shown in Table 2 and various varnishes were obtained, whose characteristics are also given in said Table.

EXAMPLE 20

250 Parts of heat curing type resinous solution obtained in Example 13 were added and kneaded well with 30 parts of rutile type titanium dioxide and 25 parts of strontium charomate in a three roll mill to obtain a primer coating composition.

EXAMPLE 21

300 Parts of the primer coating composition of Example 20 were added with 10 parts of isophorone diisocyanate blocked with ε-caprolactam to obtain a primer coating composition.

EXAMPLES 22 TO 28 AND COMPARATIVE EXAMPLES 6 TO 8

To each 250 parts of the heat curing type resinous solutions obtained in Examples 13 to 19 and Comparative Examples 3 to 5, 30 parts of rutile type titanium dioxide and 25 parts of strontium chromate were added and kneaded well in a three roll mill. To each of the mixture, were added 10 parts of Cymel-303 (methoxymethylated melamine, Trade Mark, manufactured by ACC) to obtain primer coating compositions.

Thus obtained compositions were applied and evaluated as previously stated in Test-1 and the results are shown in Table 2.

In said Table 2, ESRA-004, ESR-004 and ELR-130 are epoxy resins having epoxy equivalent of 950, 1000 and 130, all manufactured by Sumitomo Chemical Co. Ltd. (Trade marks), and Epotohto YD-014, -017 and -128 are epoxy resins having epoxy equivalent of 950, 1960 and 188, all manufactured by Toto Kasei K.K., (Trade Marks). Notes 2 to 7 have the same meanings as previously stated.

TABLE 2

| Example | 13 | 13 | 13 | 14 | 15 | 16 | 17 | 18 |
|---|---|---|---|---|---|---|---|---|
| coating composition Example | 20 | 21 | 22 | 23 | 24 | 25 | 26 | 27 |

TABLE 2-continued

| Resinous composition | | | | | | | | |
|---|---|---|---|---|---|---|---|---|
| ESAR-004 | 475 (1.0) | 475 | 475 | | | 295 (1.0) | | |
| ESAR-007 | | | | 648 (1.0) | 648 | | | |
| ESRA-004 | | | | | | | 237.5 (0.5) | |
| ESR-004 | | | | | | | | 40 (0.08) |
| ELR-130 | | | | | | | | |
| Epotohto YD-014 | | | | | | | 237.5 (0.5) | 414 (0.92) |
| Epotohto YD-017 | | | | | | | | |
| Epotohto YD-128 | | | | | | | | |
| dibasic acid | azelaic acid | azelaic acid | sebacic acid | azelaic acid | sebacic acid | dimer acid*2 | azelaic acid | azelaic acid |
| its amount | 39.2 (0.83) | 39.2 | 39.2 | 25.1 (0.63) | 27.0 (0.63) | 75 (0.84) | 39.2 (0.83) | 39.2 (0.83) |
| diethanolamine | 8.3 (0.16) | 8.3 | 8.3 | 13.4 (0.32) | 13.4 (0.32) | 5.2 (0.16) | 8.3 (0.16) | 8.3 (0.16) |
| (B'-1) | 55.9 (0.17) | 55.9 | 55.9 | | | 39.0 (0.19) | 26.8 (0.17) | 41.4 (0.19) |
| (B'-2) | | | | 75.0 (0.33) | 75.0 (0.33) | | | |
| Varnish characteristics | | | | | | | | |
| non-volatile content % | 40 | 40 | 40 | 40 | 40 | 40 | 40 | 40 |
| varnish viscosity | $Z_2$ | $Z_2$ | $Z_2$ | $Z_2$ | $Z_1$ | $Z$ | $Z_1$ | $Y$ |
| resinous (soild) acid value KOH mg/g | 1.07 | 1.07 | 1.07 | 1.18 | 1.18 | 1.07 | 1.07 | 1.07 |
| Test results | | | | | | | | |
| pencil hardness*3 | 2 H | 2 H | 3 H | 3 H | 2 H | 2 H | 3 H | 3 H |
| cross-cut tape peeling*4 | ⊚ | ⊚ | ⊚ | ⊚ | ⊚ | ⊚ | ⊚ | ⊚ |
| bend. tape peeling*5 | | | | | | | | |
| 1T | ⊚ | ⊚ | ⊚ | ⊚ | ⊚ | ⊚ | ⊚ | ⊚ |
| 2T | ⊚ | ⊚ | ⊚ | ⊚ | ⊚ | ⊚ | ⊚ | ⊚ |
| salt spray test | | | | | | | | |
| 500 hrs tape peeling at cross-cut portion*7 | ⊚ | ⊚ | ⊚ | ⊚ | ⊚ | ○ | ⊚ | ⊚ |
| 200 hrs tape peeling at bend. portion*8 | ⊚ | ⊚ | ⊚ | ⊚ | ⊚ | ⊚ | ⊚ | ○ |

| | Example | Comparative Example | | |
|---|---|---|---|---|
| | 19 | 3 | 4 | 5 |
| coating composition Example | 28 | | | |
| coating composition Comparative Example No. | | 6 | 7 | 8 |
| Resinous composition | | | | |
| ESAR-004 | | 19 (0.04) | | |
| ESAR-007 | | | | |
| ESRA-004 | | | | |
| ESR-004 | | | | |
| ELR-130 | 130 (1.0) | | | |
| Epotohto YD-014 | | 456 (0.96) | | |
| Epotohto YD-017 | | | 784 (1.0) | |
| Epotohto YD-128 | | | | 188 (1.0) |
| dibasic acid | azelaic acid | azelaic acid | azelaic acid | azelaic acid |
| its amount | 89.8 (0.95) | 39.2 (0.83) | 25.1 (0.63) | 89.8 (0.95) |
| diethanolamine | 4.6 (0.04) | 8.3 (0.16) | 13.4 (0.32) | 4.6 (0.04) |
| (B'-1) | 6.8 (0.01) | 55.9 (0.17) | | 6.8 (0.01) |
| (B'-2) | | | 75.0 (0.33) | |
| Varnish characteristics | | | | |
| non-volatile content % | 40 | 40 | 40 | 40 |
| varnish viscosity | Y-Z | X | Z | X-Y |
| resinous (solid) acid value KOH mg/g | 1.18 | 1.07 | 1.18 | 1.18 |
| Test results | | | | |
| pencil hardness*3 | 2 H | 3 H | 3 H | 2 H |
| cross-cut tape peeling*4 | ⊚ | ⊚ | ⊚ | ⊚ |
| bend. tape peeling*5 | | | | |
| 1T | ⊚ | ○ | △ | △ |
| 2T | ⊚ | ⊚ | ○ | ○ |
| salt spray test | | | | |
| 500 hrs tape peeling at cross-cut portion*7 | ⊚ | ⊚ | ⊚ | △ |
| 200 hrs tape peeling at bend. portion*8 | ⊚ | X | X | X | all figures are parts by weight. ( ) shows euqivalent ratio

EXAMPLE 29

1960 Parts of Epotohto YD-017 (Trade Mark epoxy resin having an epoxy equivalent of 1960 maufactured by Toto Kasei K.K.) were dissolved in a mixture of 816 parts of xylene and 670 parts of Cellosolve acetate and the mixture was added with 270 parts of phthalic anhydride and reacted under nitrogen gas stream at 140° C. for 1 hour. At the stage when resinous acid value reached to 46 KOH mg/g, 300 parts of xylene and 445 parts of methyl ethyl ketone were added and the mixture was allowed to cool to obtain a polybasic acid modified epoxy resin solution A″-1.

EXAMPLE 30

784 Parts of Epotohto YD-017 were dissolved in a mixture of 457 parts of xylene and 375 parts of Cellosolve acetate and the mixture was added with 25.1 parts of azelaic acid and 13.3 parts of diethanolamine and reacted under nitrogen gas stream at 140° C. for 5 hours. At the stage when resinous acid value reached to 1.2 KOH mg/g, the mixture was added with 10 parts of phthalic anhydride and reacted at 140° C. for additional one hour to the resinous acid value of 5.5 KOH mg/g. 167 Parts of xylene and 250 parts of methyl ethyl ketone were added and the mixture was allowed to cool to obtain a polybasic acid modified epoxy resin solution A"-2.

EXAMPLE 31

140 Parts of Epotohto YD-011 (Trade Mark, epoxy resin having an epoxy equivalent of 450, manufactured by Toto Kasei K.K.) were dissolved in a mixture of 50 parts of xylene and 150 parts of Cellosolve acetate and the mixture was added with 75 parts of dimer acid (carboxyl equivalent 289) and 5.2 parts of diethanolamine and reacted under nitrogen gas stream at 145° C. for 6 hours. At the stage when resinous acid value reached to 1.1 KOH mg/g, 11.8 parts of tetrachlorphthalic anhydride were added and the mixture was further reacted at 140° C. for 1 hour to the resinous acid value of 12 KOH mg/g. Then, 124 parts of xylene and 70 parts of methyl ethyl ketone were added and the mixture was allowed to cool to obtain a polybasic acid modified epoxy resin solution A"-3.

EXAMPLES 32 TO 34

The same procedures as stated in Examples 30 to 31, various polybasic acid modified epoxy resin solutions (solid 40%, A"-4 to A"-6) were prepared.

COMPARATIVE EXAMPLE 9

475 Parts of Epotohto YD-014 (Trade Mark, epoxy resin having an epoxy equivalent of 950, manufactured by Toto Kase K.K.) were dissolved in a mixture of 113 parts of xylene and 235 parts of Cellosolve acetate and the mixture was added with 37.6 parts of azelaic acid and 10.5 parts of diethanolamine and reacted under nitrogen gas stream at 145° C. for 6 hours. At the stage when resinous acid value reached to 1.1 KOH mg/g, 280 parts of xylene and 157 parts of methyl ethyl ketone were added and the mixture was allowed to cool to obtain a modified epoxy resin solution B"-1.

COMPARATIVE EXAMPLE 10

980 Parts of Epotohto YD-017 were dissolved in a mixture of 430 parts of xylene and 352 parts of Cellosolve acetate and the mixture was added with 192 parts of trimellitic anhydride and reacted under nitrogen gas stream at 140° C. for 2 hours. At the stage when resinous acid value reached to 96 KOH mg/g 156 parts of xylene and 234 parts of methyl ethyl ketone were added and the mxixture was allowed to cool to obtain a polybasic acid modified epoxy resin solution B"-2.

EXAMPLE 35

225 Parts of modified epoxy resin solution B"-1 obtained in Comparative Example 9 were mixed with 25 parts of polybasic acid modified epoxy resin solution of Example 34 and kneaded well to obtain a resinous composition C"-1. The characteristics of thus obtained resinous varnish are shown in Table 3.

EXAMPLE 36

E37.5 Parts of modified epoxy resin solution (B"-1) of Comparative Example 9 were mixed with 10 parts of polybasic acid modified epoxy resin solution (B"-2) of Comparative Example 10 and kneaded well to obtain a resinous composition C"-2. The characteristics of thus obtained resinous varnish are shown in Table 3.

COMPARATIVE EXAMPLE 11

To 100 parts of modified epoxy resin solution B"-1 of Comparative Example 9, 120 parts of polybasic acid modified epoxy resin solution B"-2 of Comparative Example 10 were added and kneaded well to obtain a resinous composition. The characteristics of thus obtained varnish are shown in Table 3.

EXAMPLES 37 TO 42

To each polybasic aid modified epoxy resin solution obtained in Examples 29 to 34 (the used quantity being shown in Table 4), 30 parts of rutile type titanium dioxide and 25 parts of strontium chromate were added and the mixture was kneaded well in three roll mill. Thereafter, 10 parts of Cymel-303 (Trade mark, methoxy methylated melamine, manufactured by ACC) were added to obtain primer coating composition, respectively.

COMPARATIVE EXAMPLE 12

To 250 parts of modified epoxy resin solution B"-1 obtained in Comparative Example 9, 30 parts of rutile type titanium dioxide and 25 parts of strontium chromate were added and the mixture was kneaded well in three roll mill. Thereafter, 10 parts of Cymel-303 were added to obtain a primer coating composition for comparison sake.

COMPARATIVE EXAMPLE 13

To 200 parts of polybasic acid modified epoxy resin solution B"-2 of Comparative Example 10, 30 parts of rutile type titanium dioxide and 250 parts of strontium chromate were added and kneaded well. Thereafter, 10 parts of Cymel-303 were added to obtain a primer coating composition.

EXAMPLE 43

225 Parts of modified epoxy resin solution B"-1 of Comparative Example 9 and 25 parts of polybasic acid modified epoxy resin solution A"-6 of Example 34 were mixed well. To thus obtained resinous composition C"-1, 30 parts of rutile type titanium dioxide and 25 parts of strontium chromate were added and kneaded well in three roll mill. Next, 10 parts of Cymel-303 were added to obtain a primer coating composition.

EXAMPLE 44

To the resinous composition comprising 235.7 parts of modified epoxy resin solution B"-1 of Comparative Example 9 and 10 parts of polybasic acid modified epoxy resin solution B"-2 of Comparative Example 10, 30 parts of rutile type titanium dioxide and 25 parts of strontium chromate were added and the mixture was kneaded well in three roll mill. Next, 10 parts of Cymel-303 were added to obtain a primer coating composition.

COMPARATIVE EXAMPLE 14

Using the resinous composition comprising 100 parts of B''-1 and 120 parts of B''-2, the same procedures as stated in Example 44 were repeated to obtain a primer coating composition.

EXAMPLE 45

As shown in Table 4, 250 parts of polybasic acid modified epoxy resin solution of Example 30, 30 parts of rutile type titanium dioxide and 25 parts of strontium chromate were mixed and kneaded well in three roll mill. To this, were added 16.7 parts of Beckamine G-1850 (urea-formaldehyde resin, manufactured by Dainippon Ink K.K., non-volatile content 60%) to obtain a primer coating composition.

EXAMPLES 46–48

Using the same procedures as stated in Example 45 but substituting Beckamine G-1850 for 10 parts of isophoron diisocyanate blocked with ε-caprolactam, 5 parts of Cymel-303 and 25 parts of Cymel-303, primer coating compositions were prepared, respectively.

Test-3

The thus obtained coating compositions of Examples 37 to 48 and Comparative Examples 12 to 14 each was applied on zinc phosphate treated galvanized steel plate, baked, coated with top-coat and evaluated as in Tests 1 and 2. The results are shown in Table 4.

TABLE 3

| Example | 29 | 30 | 31 | 32 | 33 | 34 |
|---|---|---|---|---|---|---|
| Name of resinous composition | A''-1 | A''-2 | A''-3 | A''-4 | A''-5 | A''-6 |
| Resinous composition | | | | | | |
| Epotohto YD-017 | 1960 (1) | 784 (1) | | | | |
| Epotohto YD-014 | | | | | | 437 (0.92) |
| Epotohto YD-011 | | | 140 (1) | | | |
| ESAR-007 *1 | | | | 648 (1.0) | | |
| ESAR-004 *1 | | | | | 475 (1) | |
| ESR-004 *1 | | | | | | 40 (0.08) |
| dibasic acid | | azelaic acid | dimer acid | sebacic acid | azelaic acid | azelaic acid |
| its amount *2 | | 25.1 (0.67) | 75 (0.83) | 27 (0.63) | 37.6 (0.8) | 37.6 (0.8) |
| diethanolamine | | 13.3 (0.32) | 5.2 (0.16) | 13.3 (0.32) | 10.5 (0.2) | 10.5 (0.2) |
| polybasic acid | phthal. anhyd. | phthal. anhyd. | tetrachloro-phthal. anhyd. | phthal. anhyd. | phthal. anhyd. | phthal. anhyd. |
| its amount | 270 (3.64) | 10 (0.34) | 11.8 (0.25) | 20 (0.68) | 5 (0.14) | 5 (0.14) |
| Varnish characteristics | | | | | | |
| non-volatile content % | 50 | 40 | 40 | 40 | 40 | 40 |
| varnish viscosity | Z | $Z_1$ | Z | $Z_2$ | $Z_1$ | $Z_2$ |
| resinous (solid) acid value KOH mg/g | 46 | 5.5 | 12 | 11 | 3.6 | 3.6 |

| Example | Comp Ex. 9 | Comp. Ex. 10 | 35 | 36 | Comp. Ex. 11 |
|---|---|---|---|---|---|
| Name of resinous composition | B''-1 | B''-2 | C''-1 | C''-2 | C''-3 |
| Resinous composition | | | | | |
| Epotohto YD-017 | | 980 (1) | | 237.5 parts of B''-1 | 100 parts of B''-1 |
| Epotohto YD-014 | 475 (1) | | 25 parts of A''-6 | and | and |
| Epotohto YD-011 | | | and | 10 parts | 120 parts |
| ESAR-007 *1 | | | 225 parts of B''-1 | of B''-2 | of B''-2 |
| ESAR-004 *1 | | | | | |
| ESR-004 *1 | | | | | |
| dibasic acid | azelaic acid | | | | |
| its amount *2 | 37.6 (0.8) | | | | |
| diethanolamine | 10.5 (0.2) | | | | |
| polybasic acid | | trimellitic anhydride | | | |
| its amount | | 192 (6) | | | |
| Varnish characteristics | | | | | |
| non-volatile content % | 40 | 50 | 40 | 40.4 | 45.5 |
| varnish viscosity | Y | $Z_1$ | Z | Y | Z |
| resinous (solid) acid value KOH mg/g | 1.1 | 92 | 1.50 | 5.6 | 55.6 | all figures are parts by weight. ( ) shows euqivalent ratio
*1 ESAR-007, ibid-004 and ESR-004, epoxy resins having epoxy equivalents 1640, 950 and 1000, respectively. Trade Marks, manufactured by Sumitomo Chemical Co. Ltd.
*2 carboxyl equivalent 289
*3 measured by Gardner's viscometer (25° C.)

TABLE 4

| Example | 37 | 38 | 39 | 40 | 41 | 42 | Comp. Ex. 12 | Comp. Ex. 13 |
|---|---|---|---|---|---|---|---|---|
| formulation of coating composition | | | | | | | | |
| polybasic acid modified epoxy resin solution | A''-1 | A''-2 | A''-3 | A''-4 | A''-5 | A''-6 | | B''-2 |
| its amount | 200 | 250 | 250 | 250 | 250 | 250 | | 200 |
| amount of B''-1 | | | | | | | 250 | |
| solid ratio of polybasic acid modified epoxy resin/B''-1 | | | | | | | 0/100 | |

TABLE 4-continued

| resinous acid value based on the polybasic acid | 46 | 5.5 | 12 | 11 | 3.6 | 3.6 | 0 | 92 |
|---|---|---|---|---|---|---|---|---|
| crosslinking agent | Cymel 303 | Cymel 303 | Cymel 303 | Cymel 303 | Cymel 303 | Cymel 303 | Cymel 303 | Cymel 303 |
| its amount | 10 | 10 | 10 | 10 | 10 | 10 | 10 | 10 |
| solid ratio of resinous comp./crosslink. agent | 100/10 | 100/10 | 100/10 | 100/10 | 100/10 | 100/10 | 100/10 | 100/10 |
| Test results | | | | | | | | |
| pencil hardness *1 | 3 H | 2 H | 2 H | 2 H | 2 H | 2 H | H | 3 H |
| cross-cut tape peeling *2 | ○ | ⊙ | ⊙ | ⊙ | ⊙ | ⊙ | ⊙ | X |
| bend. tape peeling *3 | | | | | | | | |
| 2T | X | ○ | ⊙ | ⊙ | ⊙ | ⊙ | ⊙ | X |
| 4T | Δ | ⊙ | ⊙ | ⊙ | ⊙ | ⊙ | ⊙ | X |
| salt spray test *4 700 hrs tape peeling at cross-cut portion | ○ | ⊙ | ⊙ | ⊙ | ⊙ | ⊙ | X | X |

| Example | 43 | 44 | Comp. Ex. 14 | 45 | 46 | 47 | 48 |
|---|---|---|---|---|---|---|---|
| formulation of coating composition | | | | | | | |
| polybasic acid modified epoxy resin solution | A"-6 | B"-2 | B"-2 | A"-2 | A"-2 | A"-2 | A"-2 |
| its amount | 25 | 10 | 120 | 250 | 250 | 250 | 250 |
| amount of B"-1 | 225 | 235.7 | 100 | | | | |
| solid ratio of polybasic acid modified epoxy resin/B"-1 | 10/90 | 5/95 | 60/40 | | | | |
| resinous acid value based on the polybasic acid | 0.36 | 4.6 | 55.2 | 12 | 12 | 12 | 12 |
| crosslinking agent | Cymel 303 | Cymel 303 | Cymel 303 | Beckamine G-1850 | Blocked NCO | Cymel 303 | Cymel 303 |
| its amount | 10 | 10 | 10 | 16.7 | 10 | 5 | 25 |
| solid ratio of resinous comp./crosslink. agent | 100/10 | 100/10 | 100/10 | 100/10 | 100/10 | 100/5 | 100/25 |
| Test results | | | | | | | |
| pencil hardness *1 | 2 H | 2 H | 3 H | 2 H | 2 H | 3 H | 2 H |
| cross-cut tape peeling *2 | ⊙ | ⊙ | X | ⊙ | ⊙ | ⊙ | ⊙ |
| bend. tape peeling *3 | | | | | | | |
| 2T | ⊙ | ⊙ | X | ○ | ⊙ | ○ | ○ |
| 4T | ⊙ | ⊙ | Δ | ⊙ | ⊙ | ⊙ | ⊙ |
| salt spray test *4 700 hrs tape peeling at cross-cut portion | ⊙ | ⊙ | X | ⊙ | ⊙ | ⊙ | ⊙ |

*1 JIS-K-5400 standard pencile scratch test
*2 JIS-K-5400 standard cross-cut method
⊙ 100/100–95/100
○ 94/100–80/100
Δ 79/100–60/100
X 59/100–10/100
*3 tape peeled degree
⊙ no peeling
○ slight peeling
Δ about ½ peeling
X almost all peeling
*4 test piece cutted to the substrate, subjected to JIS-Z-2371 salt spray test for 700 hours
⊙ (peeled width) 0–1.0 mm
○ 1.1–2.0 mm
Δ 2.1–3.0 mm
X more than 3.1 mm

EXAMPLE 49

784 Parts of Epotohto YD-017 (Trade Mark epoxy resin having an epoxy equivalent of 1960 manufactured by Toto Kasei K.K.) were dissolved in a mixture of 308 parts of xylene and 250 parts of Cellosolve acetate and the mxiture was added with 36 parts of phthalic anhydride and reacted under nitrogen gas stream at 140° C. for 1 hour. At the stage when the resinous acid value reached to 16.6 KOH mg/g, the mixture was allowed to cool. Next, 16.4 parts of N-(2-hydroxyethyl)ethyleneimine (HEEI trade mark of Sogo Yakko K.K.) were added and the mixture was reacted at 80° C. for 1 hour and then diluted with 110 parts of xylene and 167 parts of methyl ethyl ketone and allowed to cool to obtain an amphoterized epoxy resin solution A'''-1.

EXAMPLE 50

722 Parts of Epotohto YD-014 (Trade Mark epoxy resin having an epoxy equivalent of 950 manufactured by Toto Kasei K.K.) were dissolved in a mixture of 242 parts of xylene and 298 parts of Cellosolve acetate and the mixture was added with 71.5 parts of azelaic acid and 13.3 parts of diethanolamine and reacted at 140° C. for 4 hours. At the stage when the resinous acid value reached to 5.7 KOH mg/g the mixture was allowed to cool added with 4.2 parts of HEEI reacted at 80° C. for 1 hour, diluted with 254 parts of xylene and 198 parts of methyl ethyl ketone and allowed to cool to obtain an amphoterized epoxy resin solution A'''-2.

EXAMPLES 51 TO 53

Using the materials shown in Table 5, the same procedures as stated in Example 49 were repeated to obtain amphoterized epoxy resin solutions A'''-3 to A'''-5. The characteristics of thus obtained varnishes are shown in Table 5.

COMPARATIVE EXAMPLE 15

475 Parts of Epotohto YD-014 were dissolved in a mixture of 114 parts of xylene and 235 parts of Cellosolve acetate and the mixture was added with 37.6 parts of azelaic acid and 10.5 parts of diethanolamine, and reacted at 140° C. for 6 hours. At the stage when the resinous acid value reached to 1.1 KOH mg/g, 278 parts of xylene and 157 parts of methyl ethyl ketone were added and the mixture was allowed to cool to obtain a modified epoxy resin solution B'''-1.

COMPARATIVE EXAMPLE 16

784 Parts of Epotohto YD-017 were dissolved in a mixture of 320 parts of xylene and 261 parts of Cellosolve acetate and the mixture was added with 54 parts of phthalic anhydride and reacted at 140° C. for 1 hour. At the stage when the resinous acid value reached to 24.4 KOH mg/g, the mixture was allowed to cool, added with 32.4 parts of HEEI, reacted at 80° C. for 1 hour, diluted with 115 parts of xylene and 174 parts of methyl ethyl ketone and allowed to cool to obtain an amphoterized epoxy resin solution B'''-2.

COMPARATIVE EXAMPLE 17

980 Parts of Epotohto YD-017 were dissolved in a mixture of 451 parts of xylene and 368 parts of Cellosolve acetate and the mixture was added with 192 parts of trimellitic anhydride, reacted at 140° C. for 1 hour, allowed to cool when the resinous acid value reached to 96.0 KOH mg/g, added with 57.2 parts of HEEI, reacted at 80° C. for 1 hour, diluted with 164 parts of xylene and 246 parts of methyl ethyl ketone and allowed to cool to obtain an amphoterized epoxy resin solution B'''-3

EXAMPLE 54

237.5 Parts of modified epoxy resin solution B'''-1 of Comparative Example 15 and 10 parts of amphoterized epoxy resin solution A'''-1 of Example 49 were mixed together and kneaded well to obtain a resinous compositin C'''-1. The characteristics of thus obtained varnish are shown in Table 5.

EXAMPLE 55

175 Parts of modified epoxy resin solution B'''-1 of Comparative Example 15 and 60 parts of amphoterized epoxy resin solution B'''-3 of Comparative Example 17 were mixed together and kneaded well to obtain an amphoterized epoxy resin composition C'''-2. The characteristics of thus obtained varnish are shown in Table 5.

EXAMPLES 56 TO 60

Based on Table 6, each of the amphoterized epoxy resin solutions of Examples 49 to 53 was added with 30 parts of rutile type titanium dioxide and 25 parts of strontium chromate and the mixture was kneaded well in three roll mill. The mxiture was then added with 10 parts of Cymel-303 (Trade mark, methoxymethylated melamine, manufactured by ACC) to obtain a primer coating composition, in each case.

COMPARATIVE EXAMPLE 18

250 Parts of modified epoxy resin solution B'''-1 of Comparative Example 15 were added with 30 parts of rutile type titanium dioxide and 25 parts of strontium chromate and the mixture was kneaded well and added with 10 parts of Cymel-303 to obtain a primer coating composition.

COMPARATIVE EXAMPLE 19

To 200 parts of amphoterized epoxy resin solution B'''-2 of Comparative Example 16, were added 30 parts of rutile type titanium dioxide and 25 parts of strontium chromate, and the mixture was kneaded well and added with 10 parts of Cymel 303 to obtain a primer coating composition.

COMPARATIVE EXAMPLE 20

To 200 parts of amphoterized epoxy resin solution B'''-3 of Comparative Example 17, were added 30 parts of rutile type titanium dioxide and 25 parts of strontium chromate and the mixture was kneaded well and added with 10 parts of Cymel 303 to obtain a primer coating composition.

EXAMPLES 61 TO 66

Using the materials shown in Table 6 and various primer coating compositions were prepared. The crosslinking agents used were also shown in Table 6 as well as the ratio of resinous composition to crosslinking agent.

Test-4

The thus obtained coating compositions were evaluated as in Test 3 and the results were also shown in Table 6.

TABLE 5

| | Example | | | | |
|---|---|---|---|---|---|
| | 49 | 50 | 51 | 52 | 53 |
| Name of amphoterized epoxy resin composition | A'''-1 | A'''-2 | A'''3 | A'''-4 | A'''5 |
| Composition of resin | | | | | |
| Epotohto YD-017 | 784 | | | | |
| Epotohto YD-014 | | 722 (1) | | | 437 (0.92) |
| Epotohto YD-011 *1 | | | 450 (1) | | |
| ESAR-004 *2 | | | | 380 (1) | |
| ESR-004 *2 | | | | | 40 (0.08) |
| dibasic acid *3 | | azelaic acid | dimer acid | sebacic acid | azzelaic acid |
| its amount | | 71.5 (1) | 289 (1) | 27.0 (0.67) | 37.6 (0.8) |
| diethanolamine | | 13.3 (0.17) | 17.5 (0.17) | 13.3 (0.33) | 10.5 (0.2) |
| polybasic acid | phthal. anhyd | | | phthal. anhyd. | phthal. anhyd. |
| its amount | 36 | | | 18 | 5 (0.14) |
| amount if alkyleneimine | 16.4 | 4.2 | 9.5 | 7.2 | 3.0 |
| Characteristics of varnish | | | | | |
| non-volatile content % | 50 | 45 | 45 | 45 | 40 |
| varnish viscosity *4 | X | Z | X | $Z_1$ | $Z_2$ |

TABLE 5-continued

| | | | | | |
|---|---|---|---|---|---|
| resinous(solid)acid value KOH mg/g | 7.5 | 2.2 | 6.8 | 8.1 | 1.1 |

| | Comparative Example | | | Example | |
|---|---|---|---|---|---|
| | 15 | 16 | 17 | 54 | 55 |
| Name of amphoterized epoxy resin composition | B'''-1 | B'''-2 | B'''-3 | C'''-1 | C'''-2 |
| Composition of resin | | | | | |
| Epotohto YD-017 | | 784 | 980 | 237.5 parts of B'''-1 and 10 parts of A'''-1 | 175 parts of B'''-1 and 60 parts of B'''-3 |
| Epotohto YD-014 | | | | | |
| Epotohto YD-011 *1 | 475 (1) | | | | |
| ESAR-004 *2 | | | | | |
| ESR-004 *2 | | | | | |
| dibasic acid *3 | azelaic acid | | | | |
| its amount | 37.6 (0.8) | | | | |
| diethanolamine | 10.5 (0.2) | | | | |
| polybasic acid | | phthal. anhyd. | atrimellitic anhydride | | |
| its amount | | 54 | 192 | | |
| amount of alkyleneimine | | 32.4 | 57.2 | | |
| Characteristics of varnish | | | | | |
| non-volatile content % | 40 | 50 | 50 | 40.4 | 42.6 |
| varnish viscosity *4 | Y | Y | $Z_1$ | Y | Y-Z |
| resinous(solid)acid value KOH mg/g | 1.1 | 6.7 | 69.5 | 1.4 | 21.6 | each figure is by weight part; ( ) shows equivalent ratio
*1Epotohto YD-011 Trade Mark, epoxy resin having an epoxy equivalent of 450, manufactured by Toto Kasei K.K.
*2ESAR-004 and ESR-004 Trade Marks, epoxy resins having epoxy equivalents 950 and 1000, respectively, manufactured by Sumitomo Chemical Co. Ltd.
*3Dimer acid ahs a carboxy equivalent of 289
*4measured by Gardner's viscometer (25° C.)

TABLE 6

| | Example | | | | | Comparative Example | | |
|---|---|---|---|---|---|---|---|---|
| | 56 | 57 | 58 | 59 | 60 | 18 | 19 | 20 |
| formulation of coating composition | | | | | | | | |
| Name of amphoterized epoxy resin solution | A'''-1 | A'''-2 | A'''-3 | A'''-4 | A'''-5 | | B'''-2 | B'''-3 |
| its amount | 200 | 222 | 222 | 222 | 250 | | 200 | 200 |
| amount of B'''-1 | | | | | | 250 | | |
| amphoterized epoxy resin/ B'''-1 (solid ratio) | | | | | | 0/100 | | |
| amount of alkyleneimine (equivalent resinous acid value, KOH mg/g) | 12.6 | 5 | 8 | 10.4 | 3.6 | 0 | 24.0 | 30.0 |
| resinous acid value KOH mg/g | 7.5 | 2.20 | 6.8 | 8.1 | 1.1 | 1.1 | 6.7 | 69.5 |
| crosslinking agent | Cymel 303 | Cymel 303 | Cymel 303 | Cymel 303 | Cymel 303 | Cymel 303 | Cymel 303 | Cymel 303 |
| its amount | 10 | 10 | 10 | 10 | 10 | 10 | 10 | 10 |
| solid ratio of resinous comp./crosslink. agent | 100/10 | 100/10 | 100/10 | 100/10 | 100/10 | 100/10 | 100/10 | 100/10 |
| Test results | | | | | | | | |
| pencil hardness *1 | 3 H | 2 H | H | 2 H | 2 H | H | 3 H | 2 H |
| cross-cut tape peeling *2 | O | ⊙ | ⊙ | ⊙ | ⊙ | ⊙ | O | X |
| **bend. tape peeling *3** | | | | | | | | |
| 2T | X | O | ⊙ | ⊙ | ⊙ | ⊙ | X | X |
| 4T | Δ | ⊙ | ⊙ | ⊙ | ⊙ | ⊙ | Δ | X |
| **salt spray test *4** | | | | | | | | |
| 700 hrs tape peeling at cross-cut portion | O | ⊙ | ⊙ | ⊙ | ⊙ | X | X | X |

| | Example | | | | | |
|---|---|---|---|---|---|---|
| | 61 | 62 | 63 | 64 | 65 | 66 |
| formulation of coating composition | | | | | | |
| Name of amphoterized epoxy resin solution | A'''-1 | B'''-3 | A'''-2 | A'''-2 | A'''-2 | A'''-2 |
| its amount | 10 | 60 | 222 | 222 | 222 | 222 |
| amount of B'''-1 | 237.5 | 175 | | | | |
| amphoterized epoxy resin/ B'''-1 (solid ratio) | 5/95 | 30/70 | | | | |
| amount of alkyleneimine value, KOH mg/g | 0.5 | 9 | 5 | 5 | 5 | 5 |
| resinous acid value KOH mg/g | 1.5 | 21.60 | 2.20 | 2.20 | 2.20 | 2.20 |
| crosslinking agent | Cymel 303 | Cymel 303 | Beckamine* | Blocked NCO | Cymel 303 | Cymel 303 |
| its amount | 10 | 10 | 16.7 | 10 | 5 | 25 |
| solid ratio of resinous comp./crosslink. agent | 100/10 | 100/10 | 100/10 | 100/10 | 100/5 | 100/25 |
| Test results | | | | | | |

TABLE 6-continued

|  |  |  |  |  |  |  |
|---|---|---|---|---|---|---|
| pencil hardness *1 | 2 H | H | 2 H | 2 H | 3 H | 2 H |
| cross-cut tape peeling *2 | ⊙ | ○ | ⊙ | ⊙ | ⊙ | ⊙ |
| bend. tape peeling *3 |  |  |  |  |  |  |
| 2T | ⊙ | Δ | ○ | ⊙ | ○ | ○ |
| 4T | ⊙ | ○ | ⊙ | ⊙ | ⊙ | ⊙ |
| salt spray test *4 |  |  |  |  |  |  |
| 700 hrs tape peeling at cross-cut portion | ⊙ | ○ | ○ | ⊙ | ⊙ | ⊙ |

*1 JIS-K-5400 standard pencil scratch test
*2 JIS-K-5400 standard cross-cut method
    100/100–95/100
    94/100–80/100
Δ 79/100–60/100
X 59/100–10/100
*3 tape peeled degree
  no peeling
  slight peeling
Δ about ½ peeling
X almost all peeling
*4 test piece cutted to the substrate, subjected to JIS-Z-2371 salt spray test for 700 hours
  (peeled width) 0–1.0 mm
  1.1–2.0 mm
Δ 2.1–3.0 mm
X more than 3.1 mm
*Beckamine G-1850

What is claimed is:

1. A primer coating composition comprising as essential components, 50 to 95 parts by weight of a heat curing epoxy resin prepared by the interaction of product obtained by the reaction of
   (a₁) an epoxy resin component composed of 50 to 100% by weight of a resin having the formula:

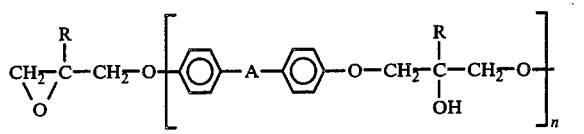

wherein R is H or CH₃—, —A— represents >C(CH₃)₂, —CH₂—, —O—, —S— or —SO₂—, and n is 0 or an integer of 1 to 14, and 50 to 0% by weight of another epoxy resin,
   (a₂) a dicarboxylic acid, and
   (a₃) a secondary amine having at least one primary hydroxylalkyl group, and product obtained by the reaction of
   (b₁) a polyisocyanate compound, and
   (b₂) an isocyanate blocking agent, the ratio of isocyanate groups in (b₁) to active hydrogen atoms in (b₂) being 5/1 to 5/4 and the ratio of primary hydroxyl groups in product to free isocyanate groups in product being 10/1 to 1/1;
   50 to 5 parts by weight of a polyether resin having the formula:

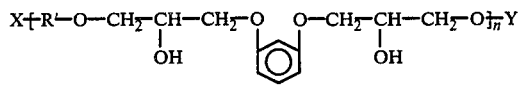

wherein
X represents

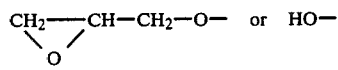

and
Y represents

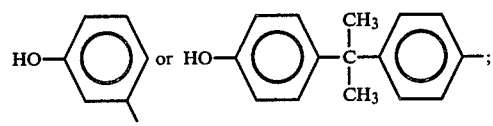

and wherein
R' is

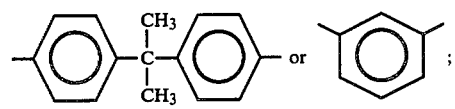

n' is 0 or an integer of 1 to 14; and
1 to 30 parts by weight of crosslinking agent other than product [B].

2. A primer coating composition according to claim 1 wherein n' is 1~14.

3. A primer coating composition according to claim 1, wherein the crosslinking agent is selected from the group consisting of a melamine-formaldehyde resin, a phenolformaldehyde resin, a urea-formaldehyde resin and a blocked isocyanate.

4. An epoxy resin varnish for primer coating use which is prepared by the reaction of product [A'] obtained by the reaction of
   (a₁) an epoxy resin component composed of 0 to 95% by weight of a resin represented by the formula:

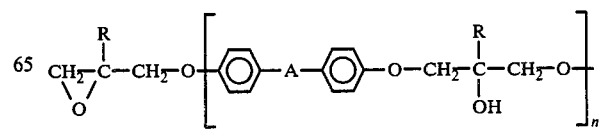

-continued

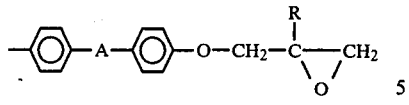

wherein R is H or CH$_3$—, —A— represents >C(CH$_3$)$_2$, —CH$_2$—, —O—, —S— or —SO$_2$, and n is 0 or an integer of 1 to 14, and 100 to 5% by weight of a resin represented by the formula:

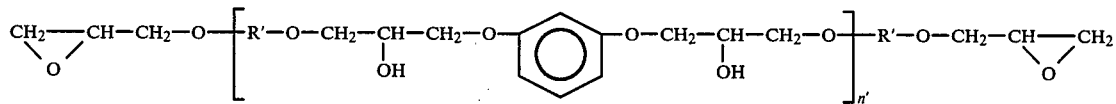

wherein R' is

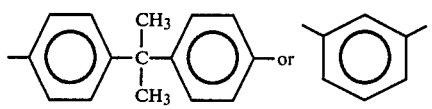

and n' is 0 or an integer of 1 to 14, (a$_2$) a dicarboxylic acid, and (a$_3$) a secondary amine having at least one primary hydroxylalkyl group, and product [B'] obtained by the reaction of (b$_1$) a polyisocyanate compound, and (b$_2$) an isocyanate blocking agent, the ratio of isocyanate groups in (b$_1$) to active hydrogen atoms in (b$_2$) being 5/1 to 5/4, and the ratio of primary hydroxyl groups in product [A'] to free isocyanate groups in product [B'] being 10/1 to 1/1.

* * * * *